United States Patent
Urakami et al.

(10) Patent No.: US 8,322,931 B2
(45) Date of Patent: Dec. 4, 2012

(54) ROTATION SUPPORT APPARATUS

(75) Inventors: Seigou Urakami, Fujisawa (JP); Yoichi Matsumoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 1009 days.

(21) Appl. No.: 11/659,217

(22) PCT Filed: Jul. 27, 2005

(86) PCT No.: PCT/JP2005/013694
§ 371 (c)(1),
(2), (4) Date: Oct. 2, 2008

(87) PCT Pub. No.: WO2006/073622
PCT Pub. Date: Feb. 9, 2006

(65) Prior Publication Data
US 2009/0215583 A1 Aug. 27, 2009

(30) Foreign Application Priority Data
Aug. 2, 2004 (JP) ................................. 2004-225136

(51) Int. Cl.
*F16C 33/46* (2006.01)
*F16C 33/48* (2006.01)

(52) U.S. Cl. ........................................ 384/580; 384/572
(58) Field of Classification Search ............... 384/572, 384/575, 580
See application file for complete search history.

(56) References Cited

U.S. PATENT DOCUMENTS

| | | | | |
|---|---|---|---|---|
| 1,700,866 A | * | 2/1929 | Tschantz | 384/580 |
| 3,110,529 A | * | 11/1963 | Schaeffler | 384/580 |
| 3,582,165 A | * | 6/1971 | Koch | 384/580 |
| 5,077,003 A | * | 12/1991 | Muraoka et al. | 420/104 |
| 5,332,318 A | | 7/1994 | Chiba | |
| 5,795,080 A | | 8/1998 | Fujiwara et al. | |

(Continued)

FOREIGN PATENT DOCUMENTS

JP 5-3645 U 1/1993

(Continued)

OTHER PUBLICATIONS

International Search Report dated Nov. 15, 2005 with English Translation (Four (4) pages).

(Continued)

*Primary Examiner* — Thomas R Hannon
*Assistant Examiner* — Matthew R Vaerewyck
(74) *Attorney, Agent, or Firm* — Crowell & Moring LLP

(57) ABSTRACT

A rotation-support apparatus having construction in which large force is not applied to continuous sections between column sections 12a and rim sections 11 even when needles 6 push in the circumferential direction against the side surfaces in the circumferential direction of the column sections 12a, thus making it possible to improve the durability of a retainer 7a.

Of both side surfaces in the circumferential direction of a straight section 15a on the inner-radial side in the middle section in the axial direction of the column sections 12a, the portion near the outer-radial side of the retainer 7a is more recessed than the portion near the inner-radial side of the retainer 7a. Moreover, this portion near the inner-radial side is located within the pitch circle P of the needles 6. Furthermore, there is no contact between the rolling surfaces of the needles 6 and the straight section 15a on the inner-radial side. As a result, it is possible to reduce the moment load applied to the column sections 12a from the needles 6.

18 Claims, 10 Drawing Sheets

U.S. PATENT DOCUMENTS

| | | | |
|---|---|---|---|
| 6,068,406 A | 5/2000 | Yoshida et al. | |
| 6,421,917 B1 | 7/2002 | Muntnich et al. | |
| 6,423,158 B1 | 7/2002 | Maeda et al. | |
| 6,648,519 B2 | 11/2003 | Fugel et al. | |
| 7,276,012 B2 * | 10/2007 | Matsumoto et al. | 475/348 |

FOREIGN PATENT DOCUMENTS

| | | |
|---|---|---|
| JP | 5-62729 U | 8/1993 |
| JP | 7-190072 A | 7/1995 |
| JP | 8-270658 A | 10/1996 |
| JP | 11-108065 A | 4/1999 |
| JP | 2000-234147 A | 8/2000 |
| JP | 2001-254744 A | 9/2001 |
| JP | 2001-516644 A | 10/2001 |
| JP | 2002-364651 A | 12/2002 |

OTHER PUBLICATIONS

International Preliminary Report on Patentability with translation of relevant portions (Five (5) pages).

* cited by examiner

ROTATION SUPPORT APPARATUS

BACKGROUND OF THE INVENTION

This invention relates to a rotation-support apparatus, and more particularly to a rotation-support apparatus that is used, for example, for supporting planetary gears that are installed in a planetary-gear mechanism of an automatic transmission for an automobile so that they freely rotate around the planetary shafts that are located in a carrier. Moreover, the rotation-support apparatus of this invention is particularly constructed with a retainer so that high-speed rotation is possible, and its construction makes it possible to adequately maintain the durability of the retainer.

Of the rotation-support units for an automobile transmission or various mechanical apparatuses, radial-needle bearings are installed in the portions where large radial loads are applied. For example, a known planetary-gear-type transmission of an automatic transmission for an automobile as described in patent document 1 supports planetary gears by way of radial-needle bearings so that they rotate freely with respect to a carrier. FIG. 9 shows an example of this kind of a rotation-support apparatus for planetary gear that supports a planetary gear so that it rotates freely with respect to the carrier. In the case of the construction shown in FIG. 9, both end sections of planetary shafts 3 are supported by and attached to a plurality of locations around the circumferential direction of a pair of parallel support plates 2a, 2b of the carrier 1. Also, a planetary gear 4 is supported by a radial-needle bearing 5 around the middle section of the planetary shaft 3 so that rotates freely.

This radial-needle bearing 5 holds a plurality of needles 6 by way of a retainer 7 so that they can roll freely, and with the outer peripheral surface around the middle section of the planetary shaft 3 as a cylindrical-shaped inner ring raceway 8, and the inner peripheral surface around the inside of the planetary gear 4 as a cylindrical-shaped outer ring raceway 9, the rolling surfaces of the respective needles 6 come in rolling contact with the inner ring raceway 8 and outer ring raceway 9. Also, floating washers 10a, 10b are placed between the both end surfaces in the axial direction of the planetary gear 4 and the inside surfaces of the support plates 2a, 2b, respectively, which makes it possible to reduce the friction force that acts between both end surfaces in the axial direction of the planetary gear 4 and the inside surfaces of the support plates 2a, 2b. As disclosed in patent document 1, a typical prior needle bearing that supports a planetary gear that is installed in a planetary-gear mechanism of an automatic transmission for an automobile is a full complement needle-type bearing that does not have a retainer. On the other hand, recently, in order to make it possible for the planetary gear to rotate at high speed, and in order to avoid contact between adjacent needles in the circumferential direction, use of a radial-needle bearing having a retainer 7 as disclosed in patent document 2, for example, is increasing.

As shown in detail in FIGS. 10 and 11, the retainer 7 of the aforementioned radial-needle bearing 5 comprises: a pair of ring-shaped rim sections 11 that are arranged so that they are separated from each other by an interval in the axial direction (left-right direction in FIGS. 9 and 11), and plurality of column sections 12. The column sections 12 are arranged intermittently around in the circumferential direction, and both end sections of each column section 12 are continuous with the outer-radial portion of the opposing inside surfaces of the rim sections 11. Moreover, the middle section in the axial direction of each of the column sections 12 has a trapezoidal bent shape that bends inward in the radial direction.

In other words, these column sections 12 comprise: a pair of straight sections 13 on the outer-radial side, a pair of inclined sections 14 and a straight section 15 on the inner-radial side. Of these, both straight sections 13 on the outer-radial side are such that the base-end sections are continuous with the outer-radial section on the inside surface of both rim sections 11, and they are parallel with the center axis of the retainer 7. Moreover, the inclined section 14 are such that the base-end sections are continuous with both straight sections 13 on the outer-radial side, and they incline inward in the radial direction of the retainer 7 going toward the middle section in the axial direction of the retainer 7. Furthermore, the straight section 15 on the inner-radial side is such that both ends are continuous with the tip-end sections of both inclined sections 14, and is parallel with the center axis of the retainer 7.

Also, the spaces that are surrounded by both side surfaces in the circumferential direction of column sections 12 that are adjacent in the circumferential direction, and the opposing inside surfaces of both rim sections 11 form pockets 16, and the needles 6 are held in these pockets 16 so that they can roll freely. The retainer 7 has stopper protrusions 17 located at locations on the side surfaces of both ends of the column sections 12 so that they align with each other and they are adjacent to each other in the circumferential direction. These stopper protrusions 17 are for preventing the needles 6 that are held inside the pockets 16 so that they can roll freely from coming out of the pockets 16 in the outward radial direction. In other words, when the needles 6 are installed together with the retainer 7 between the inner ring raceway 8 and outer ring raceway 9 (see FIG. 9), these needles 6 must be held in the pockets 16 in a state in which they are prevented from coming out in the radial direction.

Therefore, the stopper protrusions 17 are located on the opening of the pockets 16 further outward in the radial direction than the pitch circle of the needles 6 so that they face each other, and the space $D_{17}$ (see FIG. 10) between the edges of a pair of tip ends of these stopper protrusions 17 is less than the outer diameter $D_6$ (see FIG. 9) of the needles 6 ($D_6 > D_{17}$). Also, of the surfaces on both sides in the circumferential direction of the straight sections 15 on the inner-radial side of the middle section of the column sections 12, the edge of the inner end in the radial direction of the retainer 7 is located further inward in the radial direction than the pitch circle of the needles 6, and the space $D_{15}$ (see FIG. 10) between the edges of a pair of inner ends is also less than the outer diameter $D_6$ of the needles 6 ($D_6 > D_{15}$).

In order to hold the needles 6 in the pockets 16, these needles 6 are inserted into the pockets 16 from the inner-radial side of the retainer 7. When doing this, the needles 6 elastically widen the spaces $D_{15}$ between the edges of the pairs of inner ends of the straight sections 15 on the inner-radial side, and these needles 6 pass between the edges of these pairs of inner ends. With the needles 6 held in the pockets 16 in this way, the stopper protrusions 17 prevent the needles 6 from coming out in the outward radial direction, and similarly the side surfaces of the straight sections 15 on the inner-radial side of the column sections 12 prevent the needles 6 from coming out in the inward radial direction.

In the case of the prior radial-needle bearing 5 described above, when the needles 6 inside the pockets 16 formed in the retainer 7 move in the circumferential direction of the retainer 7, the rolling surfaces of the needles 6 come in direct contact with the side surfaces in the circumferential direction of the straight sections 15 on the inner-radial side of the column sections 12. In the case of a retainer 7 that is installed in a radial-needle bearing 5 for supporting a planetary gear 4 around the planetary shaft 3 of a planetary-gear mechanism, the rolling surfaces of the needles 6 do not come in direct contact with just one of the side surfaces in the circumferential direction of the straight sections 15 on the inner-radial side, but come in direct contact with alternate side surfaces in the circumferential direction due to the revolving movement of the needles 6. As a result, a moment load is applied to the column sections 12 alternately in different directions, which makes it difficult to maintain the durability of the continuous sections between both end sections of the columns sections 12 and the rim sections 11.

The reason for this will be explained with reference to FIG. 12. A planetary gear 4 that is installed in a planetary-gear mechanism revolves around a sun gear (not shown in the figure) as the carrier 1 rotates, and due to the engagement between this sun gear and a ring gear (not shown in the figure), the planetary gear 4 rotates around the planetary shaft 3. Also, the needles 6 of a radial-needle bearing 5 that supports the planetary gear 4 so that it rotates freely around the planetary shaft 3 revolve while rotating around the planetary shaft 3 due to the rotation of the planetary gear 4. In this case, the needles 6 receive a centrifugal force due to the revolving movement around the sun gear, which causes the needles 6 to move outward in the radial direction of the carrier 1 and the needles 6 are pushed against the side surface in the circumferential direction of the column sections 12.

For example, the case in which the planetary shaft 3 revolves together with the carrier 1 in the direction of the arrow α in FIG. 12 around the sun gear, and the planetary gear 4 rotates in the direction of arrow β in the same figure, will be considered. In this case, centrifugal force due to the revolving movement in the direction of the arrow α applies a force on the needles 6 as shown by the arrow γ in the same figure in the direction toward the outer-radial direction of the carrier 1. Also, due to this force in the direction of this arrow γ, the needles 6 are pushed against the side surfaces in the circumferential direction of the column sections 12. The size of the force that pushes the needles 6 against the side surfaces in the circumferential direction of the column sections 12 in this way, differs depending on the position of the needles 6 with respect to the planetary shaft 3, and needles 6 that are located in the orthogonal directions with respect to the radial direction of the carrier 1 from the center of the planetary shaft 3 (left and right end sections in FIG. 12), are pushed the strongest against the side surfaces of the column sections 12. Moreover, when seen from these column sections 12, each time the retainer rotates one time, the needles 6 are alternately pushed with a strong force in the opposite direction. As a result, force is alternately applied in the circumferential direction to the column sections 12, and the continuous sections between the column sections 12 and both rim sections 11 fatigue easily, making it difficult to maintain durability of the retainer 7.

As construction that regulates the position in the radial direction of the retainer 7 that is installed in the radial-needle bearing 5, there is a so-called needle guide, so-called outer ring guide and so-called inner ring guide. Of these, the needle guide regulates the position in the radial direction of the retainer 7 by engagement between the pockets 16 of the retainer 7 and the rolling surfaces of the needles 6. Moreover, the outer ring guide regulates the position in the radial direction of the retainer 7 by bringing the outer peripheral surface of the retainer 7 close to the outer ring raceway 9. Furthermore, the inner ring guide regulates the position in the radial direction of the retainer 7 by bringing the inner peripheral surface of the retainer 7 close to the inner ring raceway 8. In the case of any of the aforementioned construction for regulating the position in the radial direction of the retainer 7, the needles 6 are alternately pushed against both side surfaces in the circumferential direction of the column sections 12 due to centrifugal force caused by rotation of the carrier 1, so the continuous sections between the column sections 12 and both rim sections 11 fatigue easily.

However, by adopting the aforementioned outer ring guide or inner ring guide and moving all of the column sections 12 to the outer-radial side or inner-radial side of the pitch circle of the needles 6, a partial force in the radial direction occurs in the force that the needles 6 push the column sections 12. As a result, it is thought to be possible to alleviate a little of the stress in the continuous sections between the column sections 12 and both rim sections 11 that cause fatigue. However, before installing the needles 6 held in the pockets 16 between the outer ring raceway 9 and inner ring raceway 8, it is necessary to have separate construction (construction separate from that shown in FIGS. 9 to 11) for preventing the needles 6 from coming out of the pockets 16. Of the aforementioned outer ring guide and inner ring guide, the outer ring guide makes it possible to increase the area where the guide surfaces are opposed, which from the aspect of being able to reduce the surface pressure of that portion is superior than that of the inner ring guide.

Patent Document 1
Japanese Utility Model Application Publication No. H5-62729
Patent Document 2
Japanese Patent Application Publication No. H8-270658

SUMMARY OF THE INVENTION

Taking the aforementioned problems into consideration, it is the object of the present invention to provide construction of a rotation-support apparatus in which large force is not applied to continuous sections between the end sections of column sections and rim sections even when needles are pushed in the circumferential direction against the side surfaces in the circumferential direction of the column sections.

The rotation-support apparatus of this invention comprises: a support shaft having a cylindrical shaped inner ring raceway formed around an outer peripheral surface thereof; a rotating member having a cylindrical shaped outer ring raceway formed around an inner peripheral surface thereof and that is located around the support shaft so that it is concentric with the support shaft; a plurality of needles that are located between the outer ring raceway and inner ring raceway so that then can roll freely; and a retainer that holds the needles.

Of these, the retainer comprises: a pair of rim sections that are located on both sides in the axial direction of the needles; and a plurality of column sections that connects both rim sections.

The needles are held inside pockets that are formed between both rim sections and adjacent column sections in the circumferential direction.

Particularly, in the rotation-support mechanism of this invention, the middle sections in the axial direction of both side surfaces in the circumferential direction of the column sections do not come in contact with the rolling surfaces of the needles.

In the case of the rotation-support mechanism of this invention, the axially middle sections of both side surfaces in the circumferential direction of the column sections do not come in contact with the rolling surfaces of the needles. In other words, contact between the rolling surfaces of the needles and both side surfaces in the circumferential direction of the column sections occurs only in the portions near both ends in the axial direction of the column sections. Therefore, the distance from the point of force where the needles push against the column sections to the continuous sections between both end sections in the axial direction of the column sections and both rim sections becomes short. The stress that occurs in these continuous sections is proportional to the product of the size of the force applied at the point of force and the aforementioned distance, so the stress is decreased by the amount that the distance is decreased, which makes it difficult for fatigue to occur in the continuous sections, and thus it is possible to improve the durability of the retainer.

BRIEF DESCRIPTION OF THE DRAWINGS

FIG. 8A is a drawing that is similar to FIG. 3, and FIG. 8B is a view as seen from the top of FIG. 8A.

DESCRIPTION OF THE PREFERRED EMBODIMENTS

Figure 1:
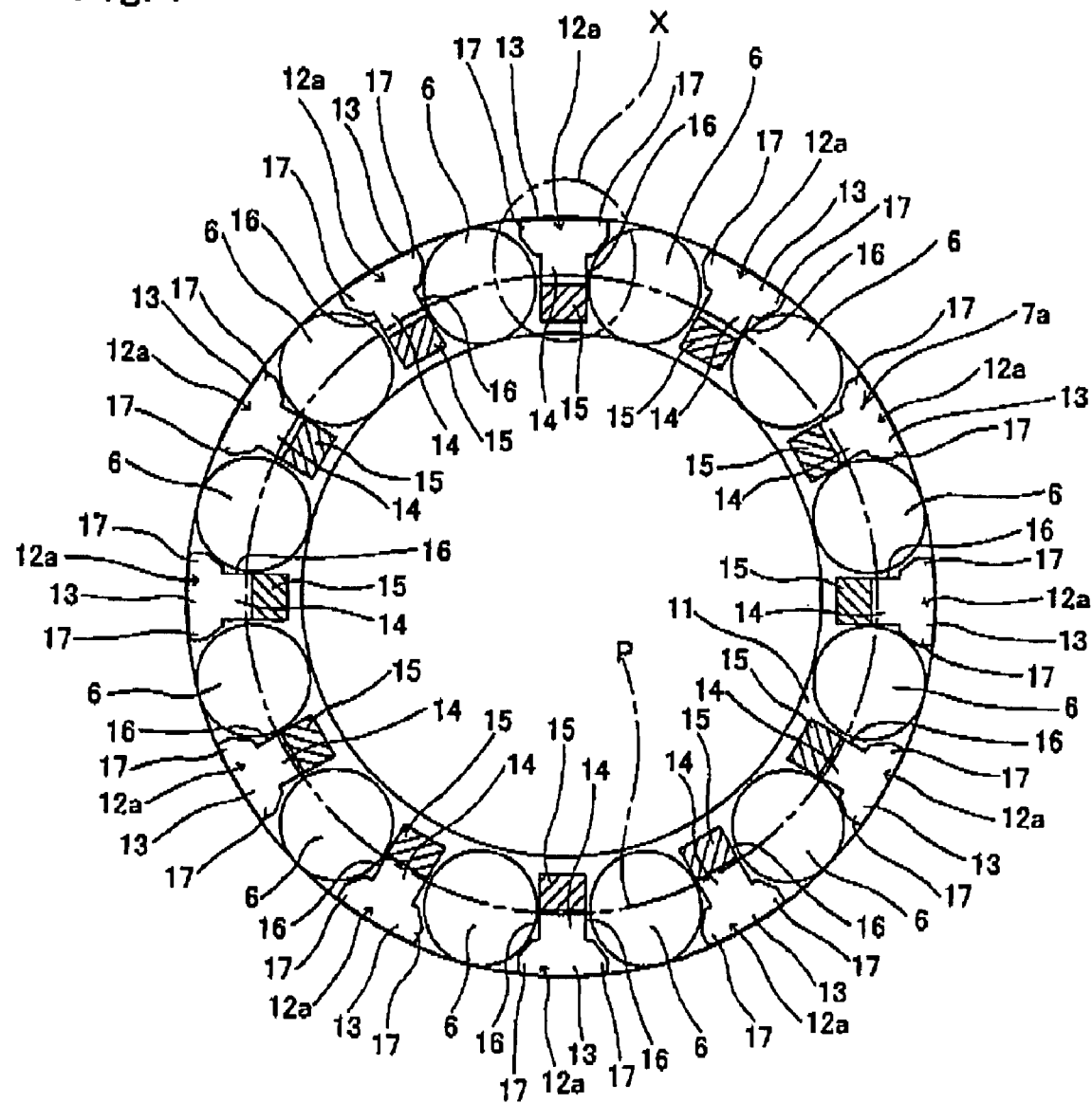
FIG. 1 is a cross-sectional drawing showing the overall construction of a first embodiment of the invention.
Figure 2:
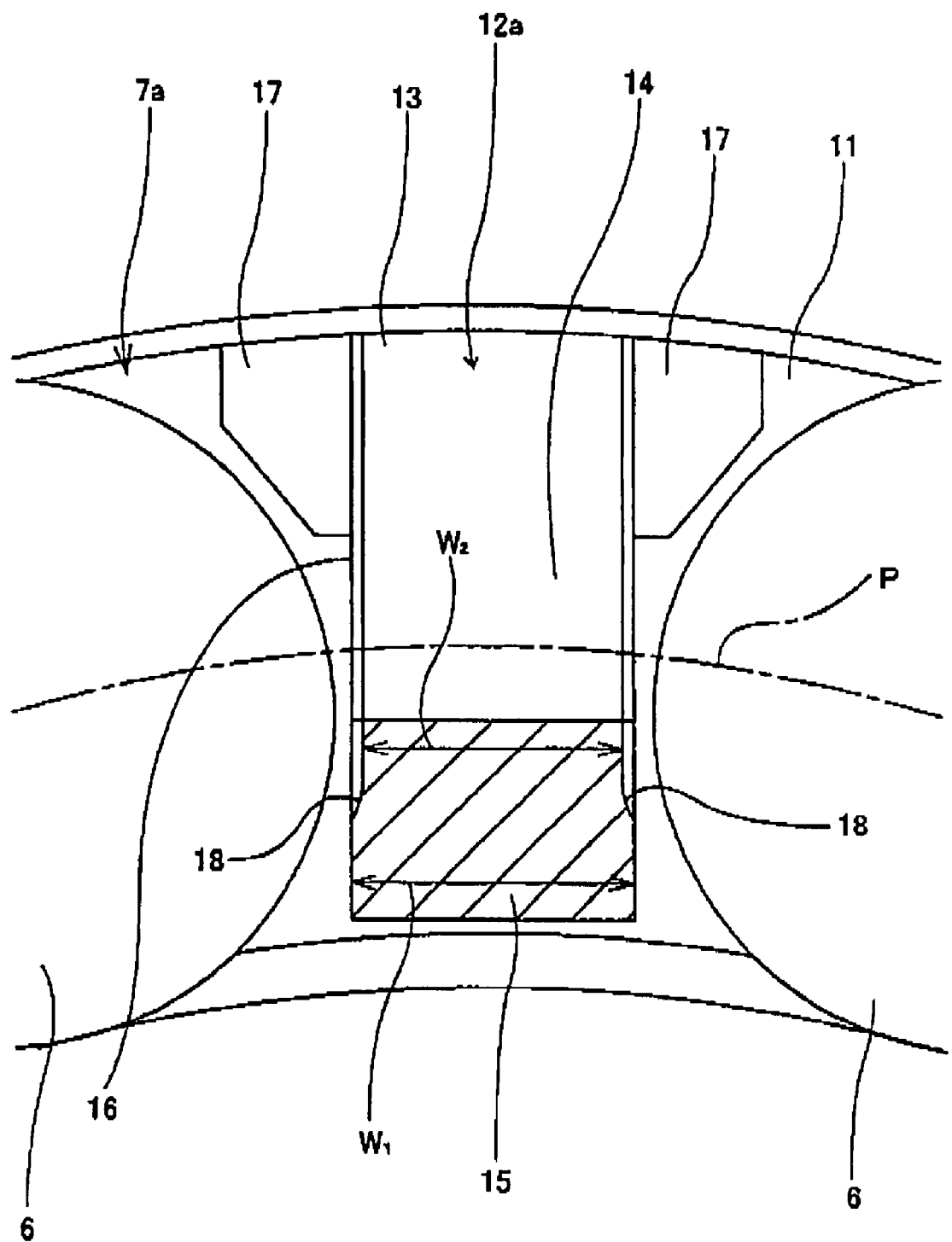
FIG. 2 is an enlarged view of part X in FIG. 1.

When embodying this invention, positioning in the radial direction of the retainer is made possible by an outer ring guide that faces the outer peripheral surfaces of both rim sections close to the inner peripheral surfaces of the rotating member, for example.

By employing this kind of construction, a component of force acting in the radial direction occurs, as described above, in the force that the needles push against the column sections. As a result, it is possible to further alleviate the stress that causes fatigue to occur in the continuous sections between both end sections of the column sections and both rim sections.

Also, positioning in the radial direction of the retainer is made possible by a needle guide that engages both side surfaces in the circumferential direction of the column sections with the rolling surfaces of the needles.

By employing this kind of construction, it is not necessary to have separate construction for preventing the needles that are held in the pockets from coming out of the pockets before installing them between the outer peripheral surface around the retainer and the inner peripheral surface of the rotating member.

Also, when embodying this invention, it is preferred to make the dimension in the axial direction of the middle sections in the axial direction of both side surfaces in the circumferential direction of the column sections that do not come in direct contact with the rolling surfaces of the needles ¼ or more than the dimension in the axial direction of the column sections (and more preferably ⅓ or more).

By maintaining this dimension in the axial direction in the middle sections in the axial direction, the distance from the point of force where the needles push against the column sections to the continuous sections between both end sections in the axial direction of the column sections and both rim sections is kept sufficiently short, and thus it is possible to adequately alleviate the stress that occurs in these continuous sections. The present invention does not particularly regulate the upper limit to the aforementioned dimension in the axial direction. As long as the function of the retainer is not lost, the larger this dimension can be is preferable.

Moreover, when embodying the present invention, it is preferable for the column sections to comprise: a pair of straight sections on the outer-radial side; a pair of inclined sections, and one straight section on the inner-radial side.

Of these, both straight sections on the outer-radial side are such that the base end sections are continuous with the areas near the outer-radial portion of the inside surfaces of both rim sections, and are arranged so that they are parallel with the center axis of the retainer.

Also, both inclined sections are such that the base end sections are continuous with both straight sections on the outer-radial side, and they incline inward in the radial direction of the retainer going toward the middle section in the axial direction of the retainer.

Also, the straight sections on the inner-radial side are such that both base sections are continuous with the tip-end sections of both inclined sections, and it is arranged so that it is parallel with the center axis of the retainer.

Moreover, construction is such that when the needles move inside the pockets, the rolling surfaces of the needles do not come in contact with the straight section on the inner-radial side even though they come in contact with both straight sections on the outer-radial side or both inclined sections.

This kind of construction stabilizes the positioning (suppresses skew) of the needles inside the pockets, so by embodying the present invention with this kind of construction, it is possible to stabilize and keep low the resistance to rotation of the rotating member, and thus improve the performance of various apparatuses that comprise this rotating member.

When embodying the above invention, for example, both side surfaces in the circumferential direction of the straight section on the inner-radial side, in the portion that corresponds to the pitch circle of the needles, are made to be more recessed in the width direction of the column sections than both side surfaces of at least both straight sections on the outer-radial side or both inclined sections.

Furthermore, for example, the portion of both side surfaces in the circumferential direction of the straight section on the inner-radial side that is near the outer-radial side of the retainer is made to be more recessed than the portion near the inner-radial side of the retainer.

By employing this kind of construction, it is possible to maintain the cross-sectional area, as well as the strength and durability of the straight section on the inner-radial side, while at the same time prevent both side surfaces in the circumferential direction of the straight section on the inner-radial side from coming in contact with the rolling surfaces of the needles.

When embodying the above invention, it is possible to make the dimension of the thickness of the straight section on the inner-radial side less than the dimension of the thickness of both straight sections on the outer-radial side and the dimension of the thickness of both inclined sections.

This kind of construction has a problem in that the cross-sectional area of the straight section on the inner-radial side becomes small, and thus it becomes difficult to maintain the strength and durability of the straight section on the inner-radial side, however, it makes it possible to adequately obtain the effect of sufficiently shortening the distance from the point of force to the continuous sections, and thus alleviate the stress that occurs in those continuous sections.

Alternatively, by bringing the inner peripheral side surface of the straight section on the inner-radial side close to the outer peripheral surface of a support shaft, it is possible to also located the entire straight section on the inner-radial side within the pitch circle of the needles.

This kind of construction has a problem in that it becomes easy for friction to occur between the inner peripheral side surface of the straight section on the inner-radial side and the outer peripheral surface of the support shaft, however, it makes it possible to adequately obtain the effect of sufficiently shortening the distance from the point of force to the continuous sections, and thus alleviate the stress that occurs in those continuous sections.

When embodying this invention, for example, the support shaft is a planetary shaft that is supported by the carrier of a planetary-gear mechanism, and the rotating member is a planetary gear that is arranged around the planetary shaft.

As described above, as the carrier rotates, a centrifugal force is applied in the direction outward in the radial direction of the carrier to the needles of a radial-needle bearing that supports the planetary gear so that it rotates freely around the planetary shaft that is supported by the carrier of the planetary-gear mechanism. Therefore, embodying this invention in this kind of planetary-gear mechanism is effective from the aspect of improving the durability of the radial-needle bearing, as well as that of the planetary-gear mechanism.

When embodying the above invention, then preferably, the planetary shaft is made of steel of which only the surface part of the surface layer is hardened by quenching.

By forming the planetary shaft in this way, it is possible to maintain the rolling fatigue life of the inner ring raceway that is formed around the outer peripheral surface of the planetary shaft, as well as suppress deformation of the planetary shaft, and it is possible to prevent rubbing between the outer peripheral surface of this planetary shaft and the inner peripheral surface of the retainer. The reason it is possible to prevent deformation of the planetary shaft by quench hardening just the surface part of the planetary shaft is explained below.

Centrifugal force due to the revolving motion, and force that occurs when there is engagement with the sun gear and ring gear are applied as a radial load to the planetary gear that is arranged around the planetary shaft. This radial load is applied to the planetary shaft by way of the needles of a radial-needle bearing as a force in the direction that would bend the planetary shaft, and as a result, the planetary shaft elastically deforms a small amount. The planetary shaft is typically made of a quenched steel, however, during quenching of the steel, retained austenite inevitably exists in the shaft. This retained austenite decomposes when the shaft is used under high-temperature conditions of 80° C. or greater, which causes volume expansion to occur. In the case of a planetary-gear mechanism in the automatic transmission of an automobile, the lubrication oil (ATF) often reaches temperatures of 80° C. or greater during use, which coincides with the condition for the retained austenite in the planetary shaft to decompose.

When the condition for the retained austenite in the planetary shaft to decompose has been met, then as the planetary shaft elastically deforms due to the aforementioned radial load, that deformation progresses to plastic deformation in the bending direction of the planetary shaft. In other words, the speed of decomposition of the retained austenite becomes faster in the part where the tensile stress acts than in the part where compression stress acts, which corresponds to the direction of the radial load, causing the planetary shaft to plastically deform in an arc shape. This speed of plastic deformation of the planetary shaft increases the higher the temperature of the planetary shaft is, the faster the speed of revolution is, the smaller the cross-sectional radius is, the longer the dimension in the axial direction is, and the larger the torque that is transmitted by the planetary gear surrounding it is. In recent years, as automobile transmissions have been made more compact, there has been a trend to decrease the diameter of the cross section of the planetary shaft, and thus it becomes easier for the planetary shaft to deform in an arc shape (combined amount of plastic and elastic deformation). Also, as the planetary shaft deforms in an arc shape as described above, the distance between the outer peripheral surface around the planetary shaft and the outer peripheral surface of the middle section of the retainer becomes closer.

Even in the case of embodying this invention, in order to stabilize the position of the needles, it is preferred that the rolling surfaces of the needles engage with the respective column sections at both end sections in the axial direction of the needles. In this case, sliding contact will occur between the edges on both sides in the circumferential direction of both inclined sections of the column sections and the rolling surfaces of the needles, so the distance between the inner peripheral side surface of the straight section on the inner-radial side in the middle portion in the axial direction of the column sections and the outer peripheral surface of the planetary shaft will become shorter. When the distance between the inner peripheral side surface of the straight section on the inner-radial side and the outer peripheral surface around the planetary shaft becomes short in this way, then as the amount of deformation of the planetary shaft increases, rubbing will occur between these surfaces, and thus there is a possibility that the retainer or planetary shaft will be damaged.

However, by using a planetary shaft of which only the surface part has been quench hardened, it is possible to keep the amount of retained austenite in the planetary shaft low, and thus it is possible to suppress deformation of the planetary shaft and to prevent rubbing between the aforementioned surfaces.

In other words, in order to suppress the amount of deformation of the planetary shaft, it is essential that the amount of bending that occurs due to plastic deformation of the planetary shaft, which increases over time as the retained austenite decomposes, be controlled. In order to do this, it is effective to not have retained austenite structure in the center in the axial direction along the entire length of the planetary shaft. From just the aspect of controlling the amount of bending, it is preferred that there be no retained austenite in the surface layer of the planetary shaft as well, however, when there is no retained austenite in this surface layer, the strength against rolling fatigue of the outer peripheral surface of the planetary shaft that functions as the inner ring raceway drops remarkably. Taking into consideration maintaining this strength against rolling fatigue, it is necessary that an amount of 15 to 40 volume % of retained austenite exist on the surface layer.

Therefore, by using a steel shaft of which only the surface part of the surface layer has been quench hardened as the planetary shaft, an amount of retained austenite is maintained in the surface layer.

Also, when the above invention is embodied, it is preferred that the density of nitrogen on the surface of the planetary shaft be 0.05 to 0.5 weight % (and more preferably, 0.09 to 0.5 weight %), and that the density of carbon on the surface of the planetary shaft be 0.9 to 1.8 weight %.

Also, it is possible to use steel containing 0.9 to 1.8 weight % of Cr as the steel for the planetary shaft.

Moreover, it is possible to use steel containing 0.4 to 0.8 weight % of Si as the steel for the planetary shaft.

Furthermore, the minimum hardness of the planetary shaft should be Hv 300 or greater.

These conditions are each effective from the aspect of stabilizing the structure of the retained austenite, and delaying decomposition of the retained austenite, so by embodying the inventions described above separately or as a combination, it possible to suppress deformation of the planetary shaft, and to prevent rubbing between the outer peripheral surface of the planetary shaft and the inner peripheral side surface of the straight section on the inner-radial side of the retainer.

Too high of a density of the nitrogen and carbon on the surface of the planetary shaft could cause the quality of the surface after quench hardening to become poor, so those densities should be kept at 0.5 weight % or less and 1.8 weight % or less, respectively. Also, too high of a density of Cr or Si in the material could cause the quality of the surface after quench hardening to become poor, so those densities should be kept at 1.8 weight % or less and 0.8 weight % or less, respectively.

Moreover, increasing the minimum hardness of the planetary shaft (generally, this is the hardness of the center section in the radial direction of the planetary shaft) is effective in suppressing bending of the planetary shaft. Therefore, the minimum hardness of the planetary shaft should be kept at Hv 300 or greater, or more preferably, Hv 350 or greater, and even more preferably, Hv 400 or greater.

Embodiment 1

FIGS. 1 to 5 shows a first embodiment of the invention. A feature of the present invention is construction that alleviates stress that occurs in the continuous sections between both end sections of the column sections 12a and the rim sections 11, and prevents damage such as cracking from occurring in those continuous sections. In order to accomplish this, this embodiment contrives a design for the shape of both side surfaces in the circumferential direction of the column sections 12a, and regulates the position in the radial direction of the retainer 7a of the straight section 15 on the inner-radial side, which is located in the middle section in the axial direction of the column sections 12a. By contriving the shape and regulating the position in the radial direction in this way, the rolling surfaces of the needles 6 do not come in contact with the middle sections in the axial direction of the column sections 12a even when the needles 6 move in the circumferential direction inside the pockets 16 of the retainer 7a.

Figure 3:
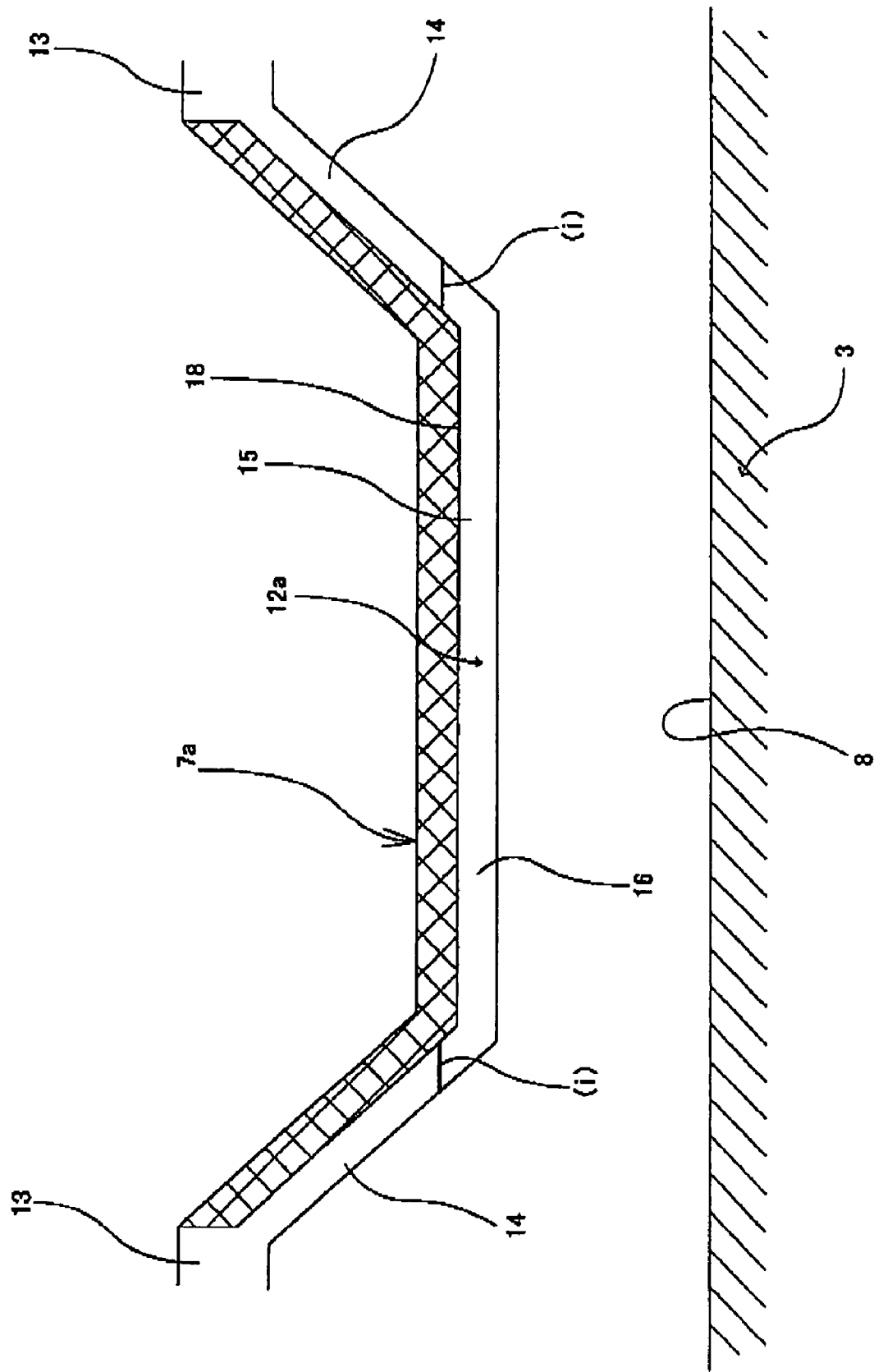
FIG. 3 is a view as seen from the side of FIG. 2 with the column section of the retainer removed.
Figure 4:
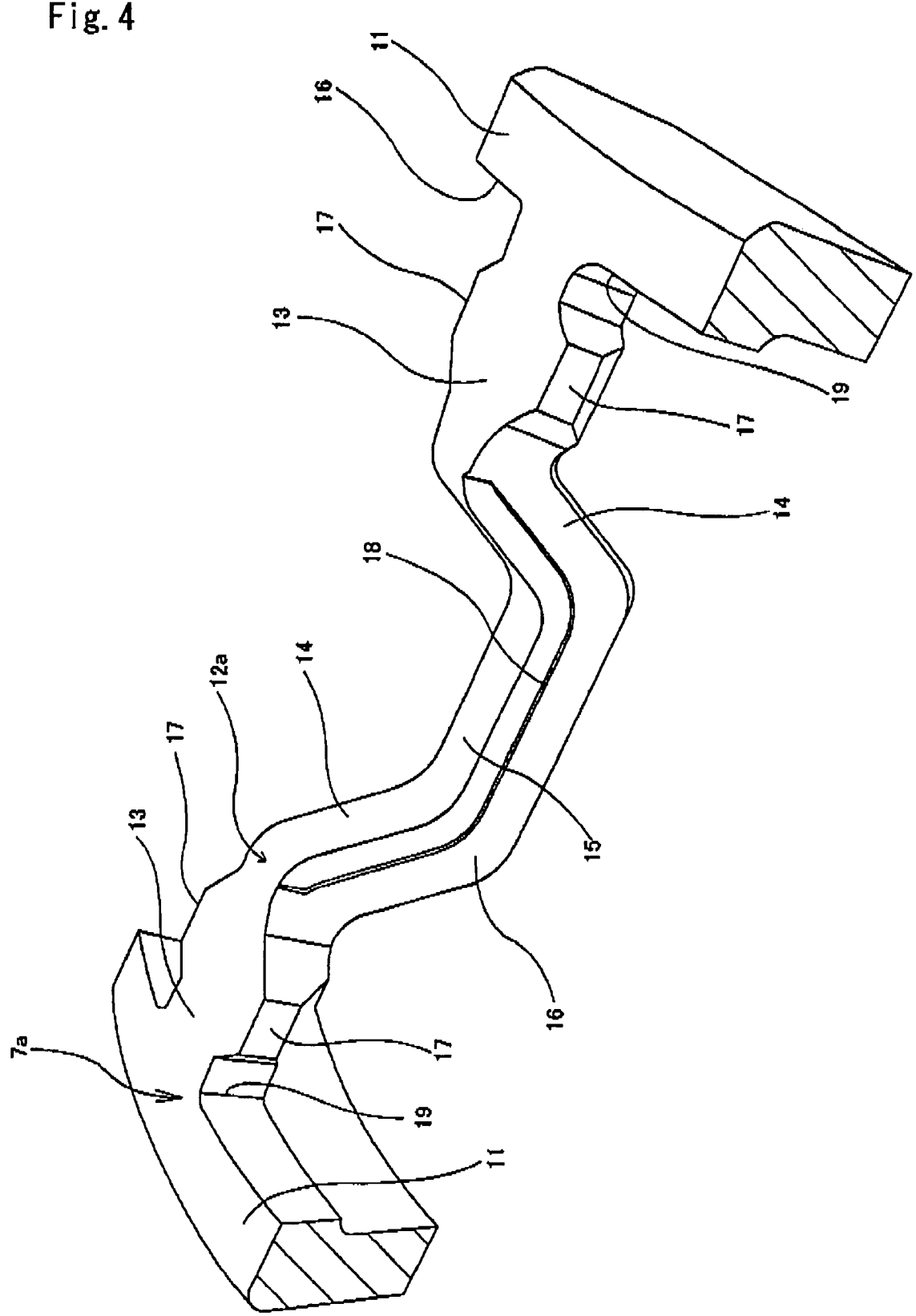
FIG. 4 is an enlarged pictorial view of a part of the retainer.
Figure 5:
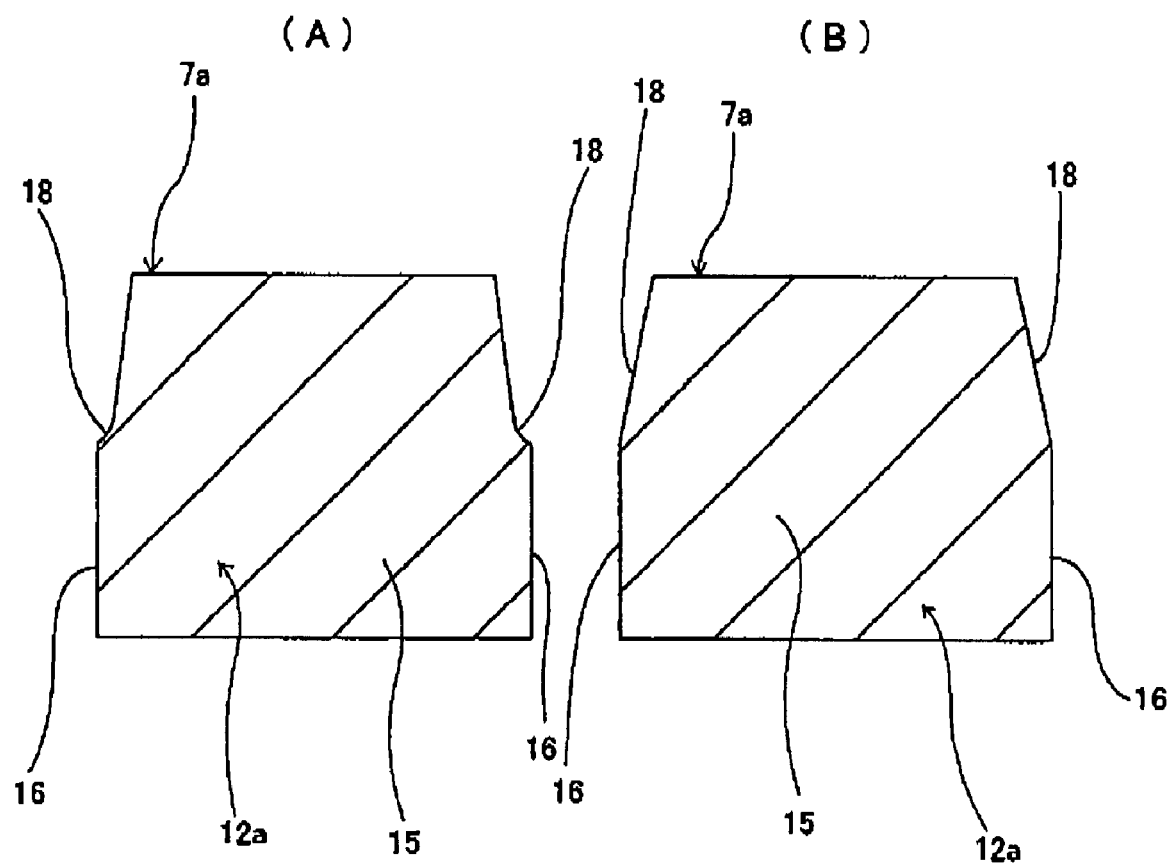
FIGS. 5A and 5B are drawings showing two examples of the cross-sectional shape of the straight section on the inner-radial side of the middle of a column section.

In other words, in this embodiment, of the column sections 12a, both side surfaces in the circumferential direction of both inclined sections 14 and the straight section 15 on the inner-radial side form stepped-shaped curved sections 18 in the middle of the thickness direction of the metal plate of the retainer 7a, so that the portion shown by the cross hatching in FIG. 3 is more recessed than the other portions. Also, the width dimensions W1, W2 in the circumferential direction of the column sections 12a are such that the inner-radial side (W1) is large, and the outer-radial side (W2) is small (W1>W2). Moreover, the straight section 15 on the inner-radial side is located relatively far on the inner side in radial direction of the retainer 7a. More specifically, the locations in the radial direction of the curved sections 18 that exist in the middle sections in the radial direction of both side surfaces in the circumferential direction of the column sections 12a are a little further inward in the radial direction than the pitch circle P of the needles 6. With this kind of construction, the rolling surfaces of the needles 6 do not come in contact with the middle sections in the axial direction of the column sections 12a, even when the needles 6 move inside the pockets 16 of the retainer 7a. Strictly speaking, the location in the radial direction where contact occurs between the rolling surfaces of the needles 6 and both side surfaces in the circumferential direction of the column sections 12a is offset a little from the pitch circle P of the needles 6, however, since this offset is very small, there is no problem even when the position of the curved sections 18 in the radial direction is as described above.

By contriving the shape of both sides in the circumferential direction, and regulating the position in the radial direction of the curved sections 18 as described above, the rolling surfaces of the needles 6 come in contact with both sides in the circumferential direction of the column sections 12a at the area of both inclined sections 14 as shown by the bold solid lines (i) in FIG. 3. Both side surfaces in the circumferential direction of the straight section 15 on the inner-radial side, located in the middle section in the axial direction of the column sections 12a, do not come in contact with the rolling surfaces of the needles 6. Therefore, the distance from the point of force where the needles 6 push the column sections 12a (center of the solid lines (i) to the continuous sections 19 between both end sections in the axial direction of the column sections 12a and both rim sections 11 (see FIG. 4) becomes short. The stress that occurs in these continuous sections 19 is proportional to the product of the magnitude of the force applied at the aforementioned point of force, and the aforementioned distance, so the stress is decreased as the distance is decreased, which makes it more difficult for fatigue of the continuous sections 19 to occur, and thus it is possible to improve the durability of the retainer 7a.

Also, in this embodiment, in order that the rolling surfaces of the needles 6 do not come in contact with both side surfaces in the circumferential direction of the straight section 15 on the inner-radial side, only the outer side half of both side surfaces in the circumferential direction are recessed by way of the curved sections 18, so it is possible to maintain the cross-sectional area of the column sections 12a. In other words, the thickness dimension of the column sections 12a, including the straight section 15 on the inner-radial side can be sufficiently maintained, and the width dimension in the circumferential direction as well can be maintained so that the inner side half is the same as the straight sections 13 on the outer-radial side. Therefore, it is possible to adequately increase the cross-sectional area of the straight section 15 on the inner-radial side and the inclined sections 14, and thus it is possible to maintain the strength and durability of the straight section 15 on the inner-radial side and the inclined sections 14. Furthermore, the width dimension in the circumferential direction of the straight sections 13 on the outer-radial side can be sufficiently maintained from the inner side to the outer side, and it is possible to sufficiently increase the cross-sectional area of these straight sections 13 on the outer-radial side, which is useful from the aspect of alleviating stress that occurs in these straight sections 13.

By regulating the direction for punching out the metal plate that will become the retainer 7a (punching out from the inner-radial side to the outer-radial side of the retainer 7a), the work of forming the curved sections 18 in the middle section in the radial direction of both sides in the circumferential direction of the column sections 12a can be performed easily. In other words, by using the broken-out sections that are created when punching out the metal plate as the curved sections 18, it is possible to obtain the desired shape for the column sections 12a. Also, the cross-sectional shape of these curved sections 18 can be either concave curved surfaces as shown in (A) of FIG. 5, or can be flat surfaces as shown in (B) of FIG. 5. They can be any shape as long as the outer side half of the straight section 15 on the inner-radial side is recessed in the circumferential direction so that that portion does not come in contact with the rolling surfaces of the needles 6.

The features of the shape of the planetary shaft 3 are as described above, and since it is not shown in the figures, a redundant explanation is omitted here.

Embodiment 2

Figure 6:
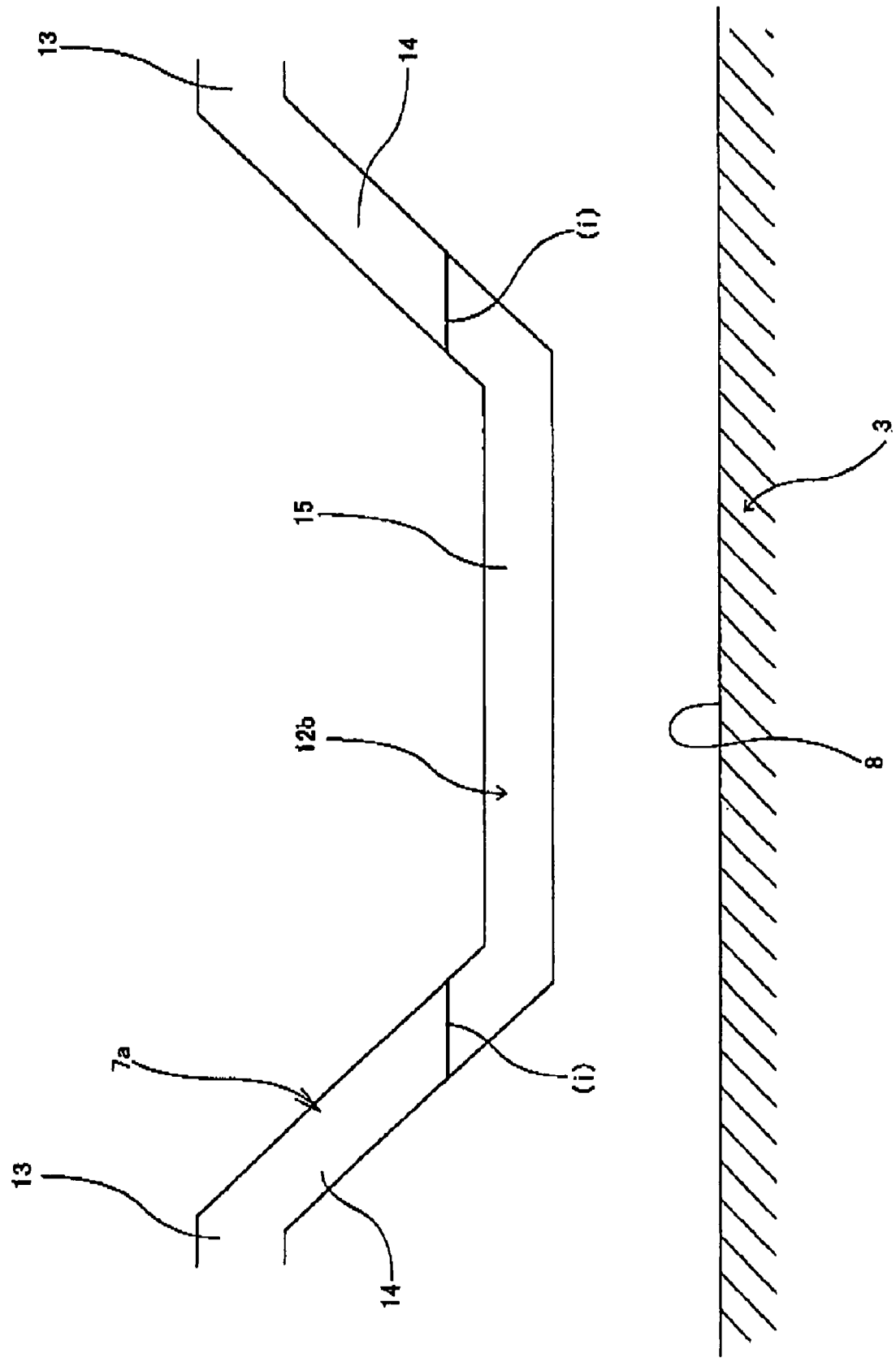
FIG. 6 is a drawing that is similar to FIG. 3 and shows a second embodiment of the invention.

FIG. 6 shows a second embodiment of the invention. In this embodiment, by bringing the inner peripheral side surface of the straight section 15 on the inner-radial side in the middle section in the axial direction of the column section 12b close to the outer peripheral surface around the support shaft 3, the entire straight section 15 on the inner-radial side is located within the pitch circle of the needles 6 (see FIGS. 1 and 2).

In this embodiment, the entire straight section 15 on the inner-radial side is located within the pitch circle of the needles 6 in this way, so the rolling surfaces of the needles 6 and both side surfaces in the circumferential direction of each column section 12b come in contact at the locations indicated by the bold solid lines (i) in FIG. 6 on part of the inclined sections 14 that exist on both sides of the straight section 15 on the inner-radial side. Therefore, the distance from the point of force where the needles 6 push against each column section 12b to the continuous sections 19 between both end sections in the axial direction of each column section 12b and both rim sections 11 (see FIG. 4) becomes short, and thus it is possible to improve the durability of the retainer 7a.

Embodiment 3

Figure 7:
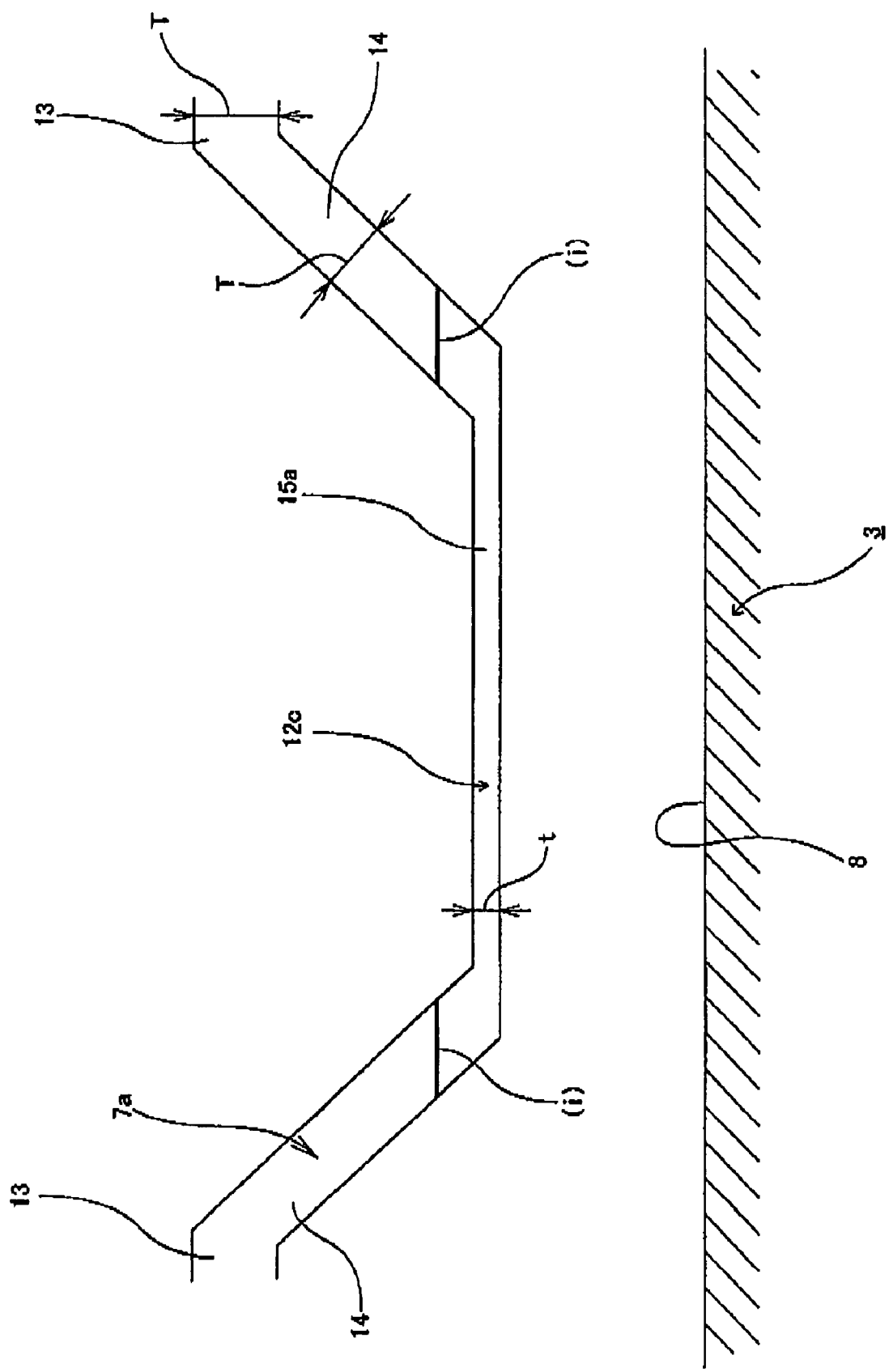
FIG. 7 is a drawing that is similar to FIG. 3 and shows a third embodiment of the invention.

FIG. 7 shows a third embodiment of the invention. In this embodiment, the thickness dimension t of the straight section 15a on the inner-radial side in the middle section in the axial direction of the column 12c is less than the thickness dimension T of both straight sections 13 on the outer-radial side, and the thickness dimension T of both inclined sections 14 (t<T). Also, the entire straight section 15a on the inner-radial side is located within the pitch circle of the needles 6 (see FIGS. 1 and 2).

In this embodiment, the outer peripheral surface of the straight section 15 on the inner-radial side is located within the pitch circle of the needles 6 in this way, so the rolling surfaces of the needles 6 and both side surfaces in the circumferential direction of each column section 12c come in contact at locations on both inclined sections 14 as shown by the bold solid lines (i) in FIG. 7. Therefore, the distance from the point of force where the needles 6 push against each of the column sections 12c to the continuous sections 19 between both end sections in the axial direction of each column section 12c and both rim sections 11 becomes short (see FIG. 4), so it is possible to improve the durability of the retainer 7a. Also, in this embodiment, the thickness dimension t of the straight section 15a on the inner-radial side is small, so as described above, it is possible to prevent the inner peripheral surface of the straight section 15a on the inner-radial side from coming too close to the outer peripheral surface around the planetary shaft 3 even when the outer peripheral surface of the straight shaft 15a on the inner-radial side is located within the aforementioned pitch circle.

Embodiment 4

Figure 8:
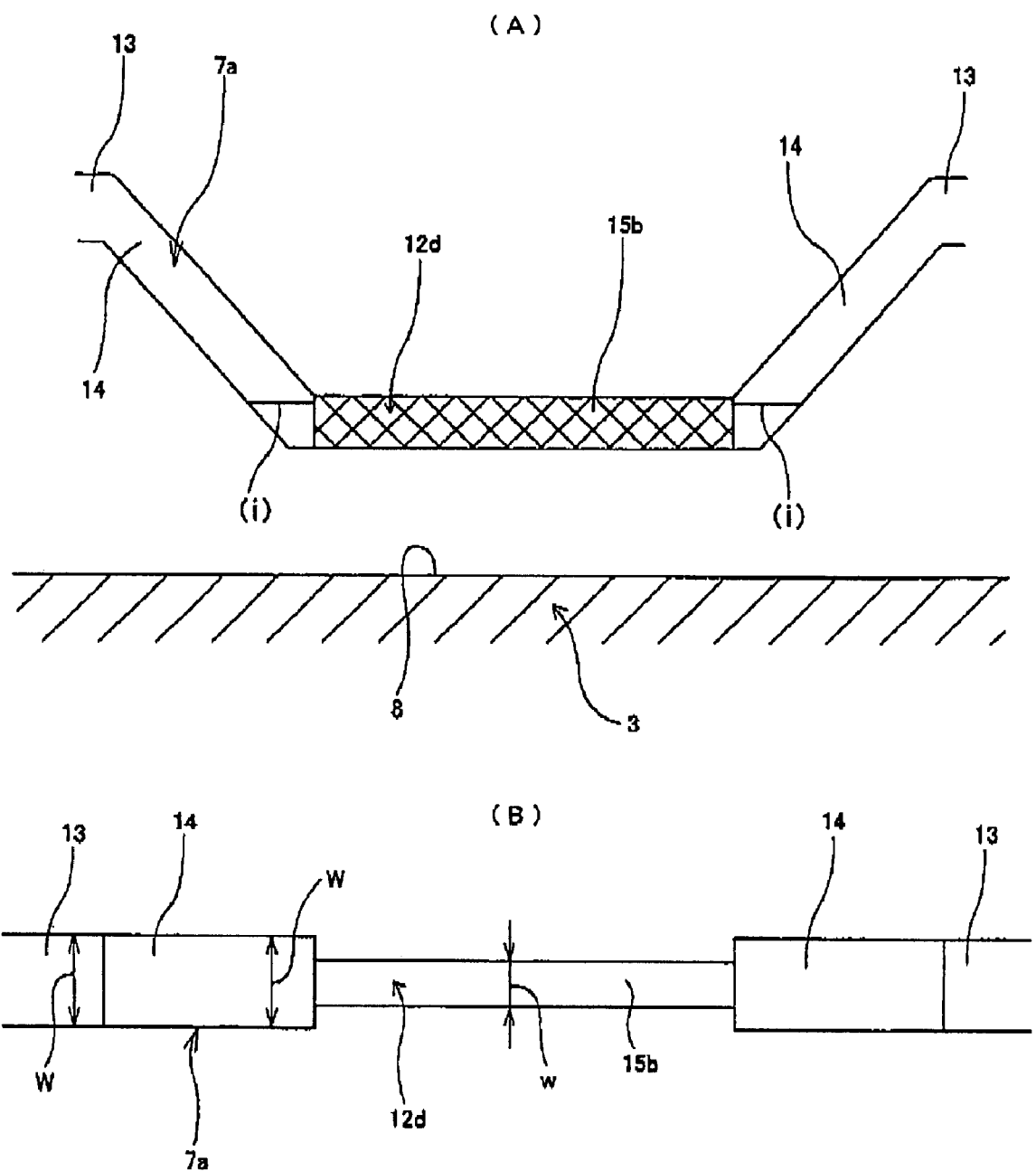
FIGS. 8A and 8B are drawings showing a fourth embodiment of the invention, where
Figure 9:
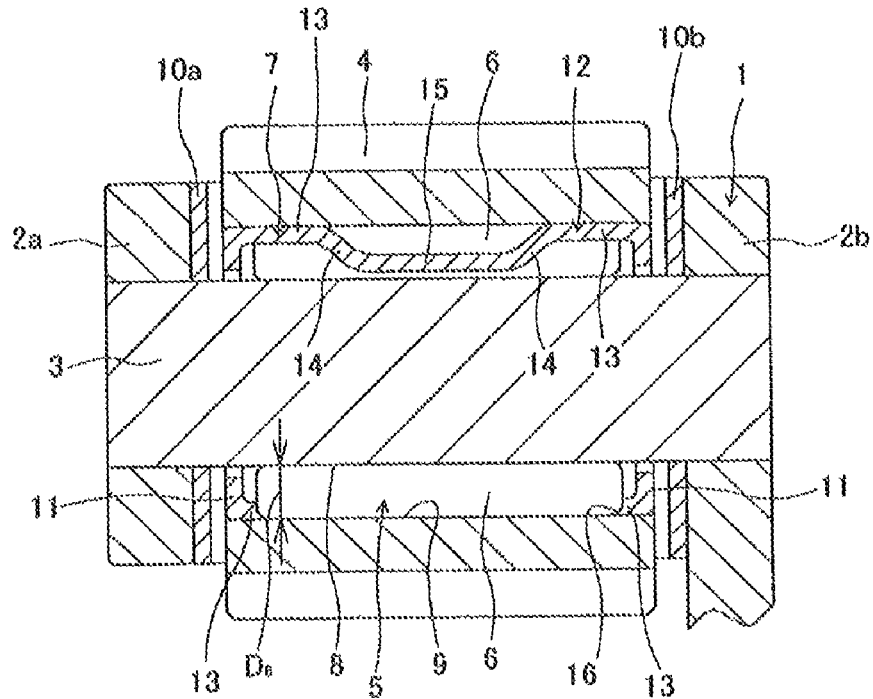
FIG. 9 is a partial cross-sectional view showing an example of a prior known rotation-support apparatus for a planetary gear.
Figure 10:
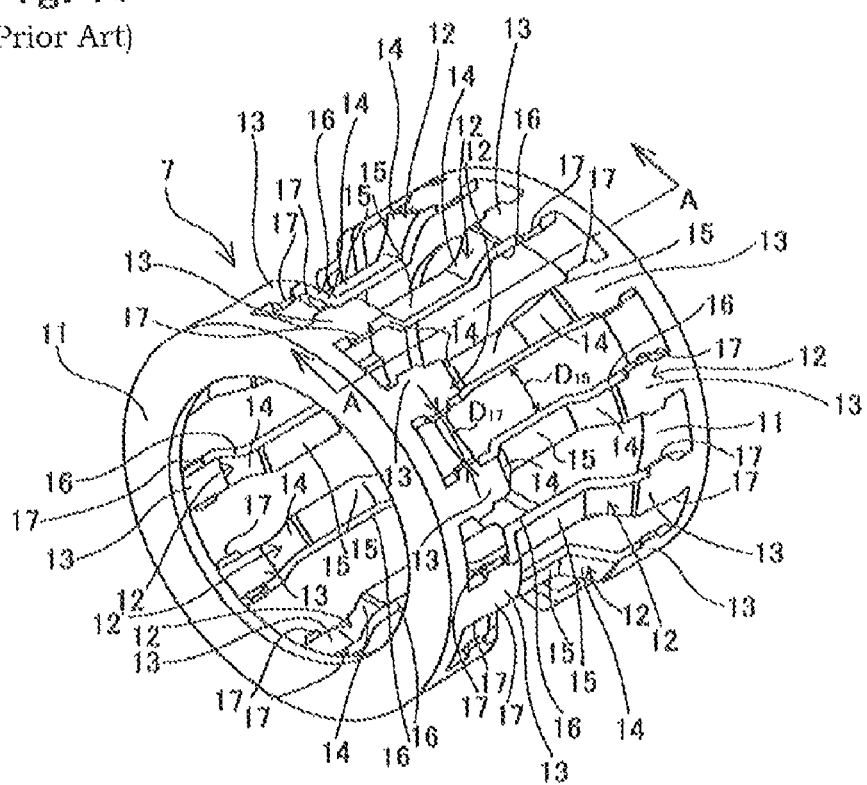
FIG. 10 is a pictorial drawing showing an example of the rotation-support apparatus for a radial-needle bearing that the present invention improves upon.
Figure 11:
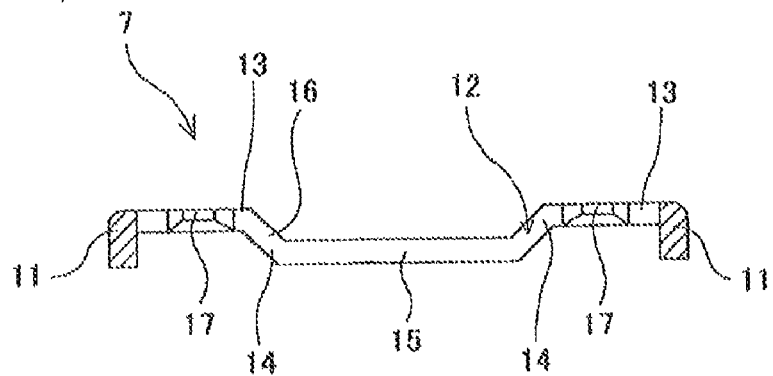
FIG. 11 is a cross-sectional view of section A-A in FIG. 10.
Figure 12:
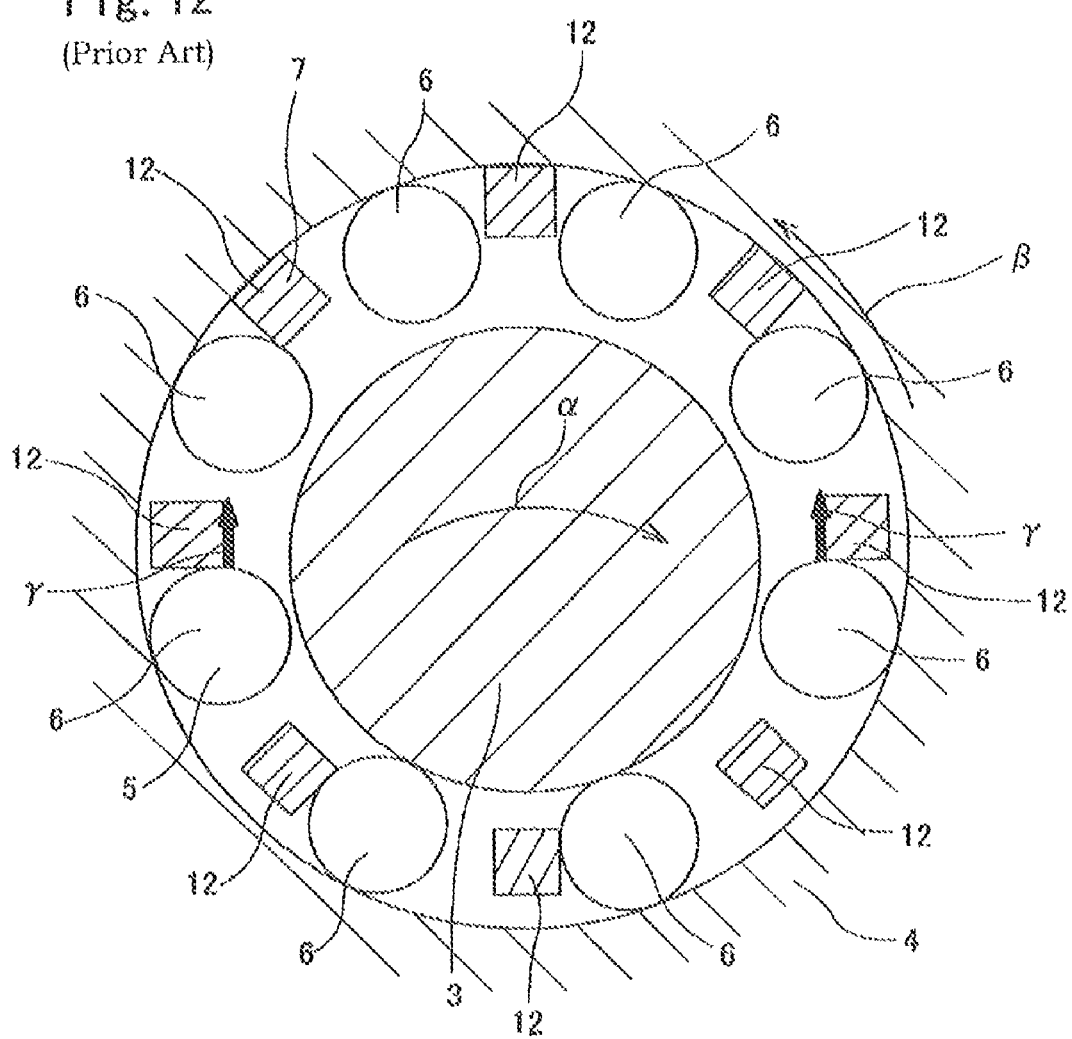
FIG. 12 is a drawing for explaining the reason for alternately applying force in opposite directions in the circumferential direction to the column sections of the retainer.

FIG. 8 shows a fourth embodiment of the invention. In this embodiment, the width dimension w in the circumferential direction of the straight section 15b on the inner-radial side of the middle section in the axial direction of the column section 12d is less than the width dimension W of both straight sections 13 on the outer-radial side, and the width dimension W of both inclined sections 14 (w<W). Therefore, in this embodiment, as shown by the cross-hatched area in FIG. 8, both side surfaces in the circumferential direction of the straight section 15b on the inner-radial side are more recessed in the axial direction of each column 12d than both side surfaces in the circumferential direction of both inclined sections 14. Also, the straight section 15b on the inner-radial side is located within the pitch circle of the needles 6 (see FIGS. 1 and 2).

In the case of this embodiment, both side surfaces in the circumferential direction of the straight section 15b on the inner-radial side are more recessed than both side surfaces in the circumferential direction of the inclined sections 14, so the rolling surfaces of the needles 6 and both side surfaces in the circumferential direction of each column section 12c come in contact at locations on both inclined sections 14 as shown by the bold solid lines (i) in FIG. 8. Therefore, the distance from the point of force where the needles 6 push against each of the column sections 12d to the continuous sections 19 between both end sections in the axial direction of each column section 12d and both rim sections 11 becomes short (see FIG. 4), so it is possible to improve the durability of the retainer 7a. Also, in this embodiment, the straight section 15b on the inner-radial side is located within the pitch circle of the needles 6, so it is possible to prevent the inner peripheral surface of the straight section 15b on the inner-radial side to come close to the outer peripheral surface around the planetary shaft 3.

What is claimed is:
1. A rotation-support apparatus comprising:
a support shaft having a cylindrical shaped inner ring raceway formed around an outer peripheral surface thereof;
a rotating member having a cylindrical shaped outer ring raceway formed around an inner peripheral surface thereof, and that is located around the support shaft so that it is concentric with the support shaft;
a plurality of needles that are located between the outer ring raceway and inner ring raceway so that they can roll freely; and
a retainer that holds the needles, the retainer provided with
a pair of rim sections that are located on both sides in the axial direction of the needles,
a plurality of column sections that connect both rim sections, and
the needles held inside pockets that are formed between both rim sections and adjacent column sections in the circumferential direction,
wherein each of the column sections comprises a pair of straight sections on an outer-radial side, a pair of inclined sections, and one straight section on an inner-radial side; wherein each of the pair of straight sections on the outer-radial side are formed so that a respective base section of each is continuous with an outer-radial portion of an inner side surface of a respective rim section, and are arranged so that the straight sections on the outer-radial side are parallel with a center axis of the retainer;

each of the pair of inclined sections are formed so that a base section of each is continuous with a respective straight section on the outer-radial side, and incline in the direction inward in the radial direction of the retainer going toward a middle section in the axial direction of the retainer;

the straight section on the inner-radial side is formed so that each end section of the straight section on the inner-radial side is continuous with a respective tip-end section of a respective inclined section, and is arranged so that the straight section on the inner-radial side is parallel with the center axis of the retainer; and wherein the straight section on the inner-radial side and both the inclined sections have curved sections in a middle of the thickness direction such that, of both side surfaces in the circumferential direction of the straight section on the inner-radial side and both the inclined sections, portions that are near the outer-radial side of the retainer are more recessed in the circumferential direction than portions that are near the inner-radial side of the retainer; and wherein a location in the radial direction where contact occurs between the rolling surfaces of the needles and both side surfaces in the circumferential direction of the column sections is between the location in the radial direction of an outer peripheral surface of the straight section on the inner-radial side and the location in the radial direction of the curved sections, and when the needles move inside the pockets, the rolling surfaces of the needles come into contact with portions of both the inclined sections which are not recessed in the circumferential direction, and the rolling surfaces of the needles do not come in contact with the straight sections on the inner-radial side.

2. The rotation-support apparatus of claim 1 wherein a position in the radial direction of the retainer is regulated by an outer ring guide.

3. The rotation-support apparatus of claim 1 wherein a position in the radial direction of the retainer is regulated by a needle guide.

4. The rotation-support apparatus of claim 1 wherein the dimension in the axial direction of a middle section in the axial direction of both side surfaces in the circumferential direction of the column sections does not come in contact with the rolling surfaces of the needles.

5. The rotation-support apparatus of claim 1 wherein in a portion that corresponds to the pitch circle of the needles, both side surfaces in the circumferential direction of the straight section on the inner-radial side are more recessed in the axial direction of the column sections than both side surfaces in the circumferential direction of both inclined sections.

6. The rotation-support apparatus of claim 1 wherein the thickness dimension of the straight section on the inner-radial side is less than the thickness dimension of both straight sections on the outer-radial side and the thickness dimension of both inclined sections.

7. The rotation-support apparatus of claim 1 wherein by bringing the inner peripheral side surface of the straight section on the inner-radial side close to the outer peripheral surface around the support shaft, the entire straight section on the inner-radial side is located within the pitch circle of the needles.

8. The rotation-support apparatus of claim 1, wherein the support shaft is a planetary shaft that is supported by the carrier of a planetary-gear mechanism, and the rotating member is a planetary gear that is located around the planetary shaft.

9. The rotation-support apparatus of claim 8 wherein the planetary shaft is made of steel of which only the surface part is hardened by quenching.

10. The rotation-support apparatus of claim 9 wherein the minimum hardness of the planetary shaft is Hv 300 or greater.

11. The rotation-support apparatus of claim 9 wherein the steel also contains Cr at a density of 0.9 to 1.8 weight %.

12. The rotation-support apparatus of claim 11 wherein the steel also contains Si at a density of 0.4 to 0.8 weight %.

13. The rotation-support apparatus of claim 12 wherein the minimum hardness of the planetary shaft is Hv 300 or greater.

14. The rotation-support apparatus of claim 9 wherein the density of nitrogen on the surface of the planetary shaft is 0.05 to 0.5 weight percent, and the density of carbon on the surface of the planetary shaft is 0.9 to 1.8 weight %.

15. The rotation-support apparatus of claim 14 wherein the steel also contains Cr at a density of 0.9 to 1.8 weight %.

16. The rotation-support apparatus of claim 14 wherein the steel also contains Si at a density of 0.4 to 0.8 weight %.

17. The rotation-support apparatus of claim 14 wherein the minimum hardness of the planetary shaft is Hv 300 or greater.

18. The rotation-support apparatus of claim 9 wherein the steel also contains Si at a density of 0.4 to 0.8 weight %.

* * * * *